United States Patent [19]

Pardini et al.

[11] Patent Number: 4,515,750
[45] Date of Patent: May 7, 1985

[54] SEALING COUPLING

[75] Inventors: John A. Pardini, Brookfield; Robert C. Brubaker, Naperville; John J. Rusnak, Orland Park, all of Ill.

[73] Assignee: The United States of America as represented by the United States Department of Energy, Washington, D.C.

[21] Appl. No.: 420,070

[22] Filed: Sep. 20, 1982

[51] Int. Cl.³ .......................... G21C 3/04; G21C 3/12
[52] U.S. Cl. .................................... 376/446; 376/364; 376/292; 376/203; 285/24; 285/27; 277/207 A
[58] Field of Search ...................... 285/24, 27, 334.4; 376/203, 291, 292, 443, 446, 352, 364, 204; 277/207 A

[56] References Cited

U.S. PATENT DOCUMENTS 1,780,693 11/1930 Yazel .
2,434,107 1/1948 Folsom .
4,071,269 1/1978 Halling et al. .
4,087,323 5/1978 Pardini et al. .
4,103,937 8/1978 Wakefield .
4,181,322 1/1980 Neumann .
4,238,291 12/1980 Neuenfeldt et al. ................ 376/292
4,298,219 11/1981 Amelink .
4,348,353 9/1982 Christiansen et al. .

FOREIGN PATENT DOCUMENTS 1212046 3/1966 Fed. Rep. of Germany ...... 376/292

Primary Examiner—Harvey E. Behrend
Assistant Examiner—Richard W. Wendtland
Attorney, Agent, or Firm—Bruce Mansfield; Paul A. Gottlieb; Judson R. Hightower

[57] ABSTRACT

Disclosed is a remotely operable releasable sealing coupling which provides fluid-tight joinder of upper and a lower conduit sections. Each conduit section has a concave conical sealing surface adjacent its end portion. A tubular sleeve having convex spherical ends is inserted between the conduit ends to form line contact with the concave conical end portions. An inwardly projecting lip located at one end of the sleeve cooperates with a retaining collar formed on the upper pipe end to provide swivel capture for the sleeve. The upper conduit section also includes a tapered lower end portion which engages the inside surface of the sleeve to limit misalignment of the connected conduit sections.

7 Claims, 2 Drawing Figures

U.S. Patent   May 7, 1985   4,515,750
FIG. 1
FIG. 2
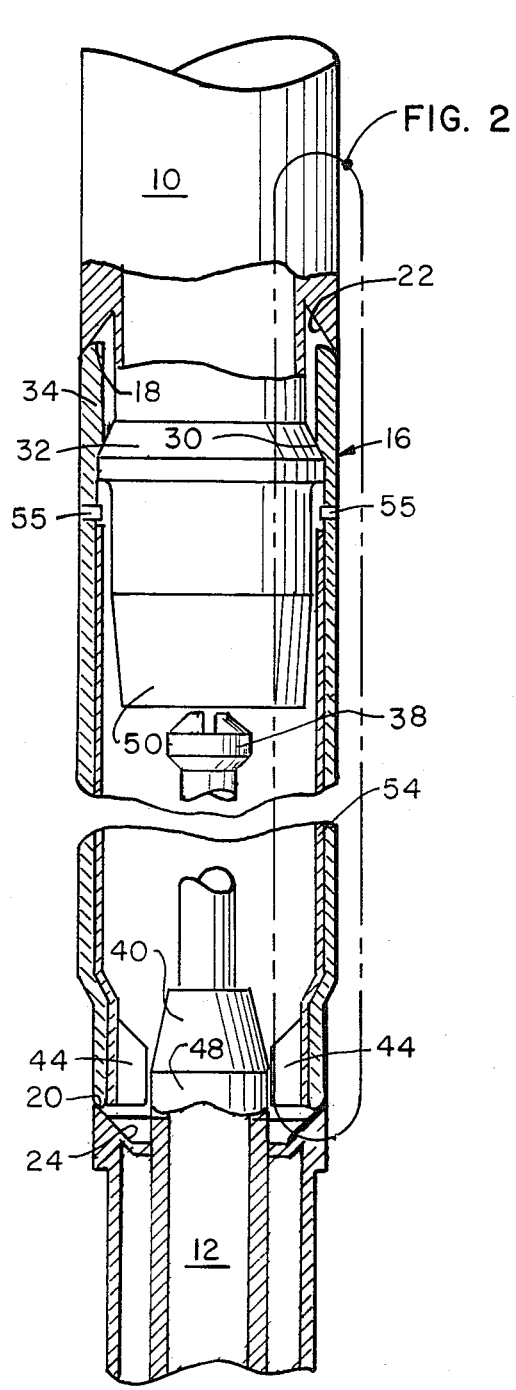
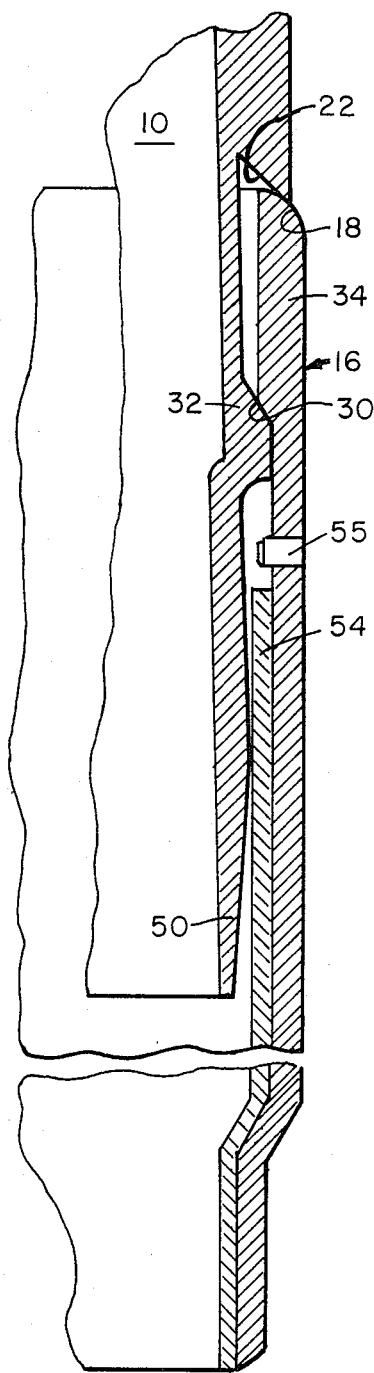

SEALING COUPLING

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention pertains to releasable sealing couplings which provide a remote end-to-end joinder of two offset but generally parallel metal tubular conduits. This invention also pertains to such releasable sealing couplings for use in tubular conduits carrying a liquid metal, particularly liquid sodium, wherein the conduits are submerged in a bath of the liquid metal. Further, the invention relates to a fast safety test reactor incorporating such a coupling in a crowded portion thereof.

It is an object of the present invention to provide a space-efficient sealing coupling that can be operated at a distance remote from the coupling. One example of such remote operation is the coupling joinder of fuel rod elements in the lower portion of a metal-cooled nuclear reactor core. This area of the reactor is not accessible for direct manipulation by man or machine, due to crowded space conditions, as well as high temperature and radiation levels. Because of the liquid metal environment, and especially when the liquid metal comprises sodium, the use of conventional sealing materials such as rubber, plastic, and most metals is precluded. Accordingly, it is another object of the present invention to provide a remote coupling for use in a liquid metal, and in particular a liquid sodium environment.

While affording a flexible connection between misaligned tubular conduits, the coupling must have a self-limiting deflection to prevent further lateral displacement of an unstable remotely located conduit such that the sealing coupling cannot be initiated or maintained. Accordingly, it is another object of the present invention to provide such a self-limiting coupling.

A tank-type liquid-metal-cooled nuclear reactor includes a reactor core comprised of a closely-spaced array of elongated tubular fuel assemblies that are installed and removed in vertical directions, through a precisely-dimensioned access port of minimal size which is located in the top of the reactor tank. Separate coolant circuits of liquid metal are maintained in the tank and in each individual fuel assembly. Current techniques for monitoring reactor operation require diagnostic equipment located in an upper extension of the fuel assembly housing. This equipment is located downstream in an upwardly-directed coolant flow which has passed over lower fuel assembly sections. An intermediate sealing coupling is required to join upper and lower sections of the fuel assembly housing. Several problems arise if the sealing coupling either constricts internal cooling flow, or overlies the outer dimensions of the fuel assembly housing. Accordingly, it is another object of the present invention to provide a fluid-tight releasable, thin-walled, flexible coupling that does not exceed the external diameters of the pipes to which it is connected, and which does not reduce the cross-sectional area required for internal flow conditions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention provides a releasable sealing coupling that is laterally deflectable to accommodate angular and lateral misalignment between upper and lower tubular conduit sections. The coupling includes a cylindrical sleeve having convex spherically-rounded end surfaces which mate with concave conical sockets formed in the ends of the conduit sections to be connected. The sleeve, which is free to swivel, is held captive on an end portion of an upper conduit section which includes an outwardly extending collar. The collar engages an inwardly directed lip formed on the inside of the sleeve. The upper conduit section also includes a tapered lower end portion which engages an inside surface of the sleeve to prevent excessive lateral deflection of the sleeve and to limit misalignment of connected conduit sections, which would cause a breaking of the coupling seal.

BRIEF DESCRIPTION OF THE DRAWINGS

FIG. 1 is a partially broken away cross-sectional view of the sealing coupling according to the invention.

FIG. 2 is an enlargement of a portion of FIG. 1, showing the sealing coupling in greater detail.

DETAILED DESCRIPTION OF THE PREFERRED EMBODIMENT

Referring to the drawings, an arrangement for providing a sealing coupling between upper and lower tubular conduit or housing sections 10, 12, respectively, is shown. The sealing coupling includes a coupling sleeve 16 of generally cylindrical configuration, having upper and lower convex spherical sealing ends 18, 20, respectively. The spherical ball-shaped ends 18, 20 engage downwardly and upwardly opening concave conical sockets 22, 24 formed in upper and lower housing sections 10, 12, respectively.

The upper end of coupling sleeve 16 includes an inwardly projecting lip member 34, which has a camming surface 30 at its lower end and spherical sealing member 18 at its upper end. Coupling sleeve 16 is held captive on upper housing section 10 by the lip member 34 which interferes with a collar 32 formed in pipe section 10. In the preferred embodiment, the lower end of section 10, including collar 32, is formed as a separate member which is inserted in sleeve 16 and then threadingly engaged with the remainder of section 10. When connected to pipe section 10, coupling sleeve 16 is free to rotate or swivel thereabout during initial connection, due to a slight clearance or gap between upper spherical end 18 and conical socket 22. After connection, sleeve 16 is free to swivel about both housing sections, owing to the ball-cone arrangements of spherical surfaces 18, 20 and conical surfaces 22, 24.

The lowermost end of housing section 10 includes a tapered end 50 which contacts an inside surface of coupling sleeve 16 to thereby limit lateral deflection of the coupling sleeve during initial alignment to prevent deflection of unstable, severely misaligned housing sections. Swivel deflection of the coupling sleeve is also limited after connection of the housing sections to prevent breaking of the fluid-tight seal between housing sections and the coupling sleeve.

Inwardly extending alignment vanes 44 are provided adjacent the lower end of sleeve 16 to aid in alignment during remote coupling operations. When the joined combination of upper housing section 10 and coupling sleeve 16 is lowered into position adjacent the upper end of housing section 12, vanes 44 provide initial contact with a first cone-like guide means 38 located at the upper tip of housing section 12. Upon further lowering, vanes 44 slide along a second cone-like guide means 40 in a camming action, so as to provide further alignment between coupling sleeve 16 and lower housing section 12. Final alignment is provided when vanes 44 contact cylindrical guide section 48 of the lower housing section 12. During final alignment between the coupling sleeve 16 and housing section 12, sealing engagement between spherical sealing ends 18, 20 and conical sockets 22, 24 is completed. A downwardly directed spring force applied to the top of upper housing section 10 maintains the line-contact sealing engagement between spherical sealing ends 18, 20 and conical sockets 22, 24.

The sealing coupling arrangement of the present invention avoids any substantial excursion or protrusion beyond the interior and exterior wall surfaces of pipe sections 10, 12. That is, nearly constant inner and outer diameters of the pipe sections are maintained throughout the sealing coupling arrangement. This feature of the present invention is especially important when the space surrounding the sealing coupling is limited, where the mass of the sealing coupling must be held to a minimum, and where a minimum internal area must be maintained to accommodate flow conditions and other like system requirements.

While the coupling sealing arrangement of the present invention can be employed in a variety of applications, it finds particular application in those situations which require a remote coupling, and where manipulation immediately adjacent the coupling is not possible. One example of such an arrangement is found in the EBR-II sodium cooled nuclear test reactor operated at the Argonne National Laboratory. The fuel assemblies of this reactor are comprised of upper and lower housing sections which when coupled together, function as a closed coolant circuit. The upper housing section 10, an elongated cylinder, contains diagnostic instrumentation equipment for monitoring the operation of fuel assemblies located in the lower, upstream section 12. Indirect monitoring of the fuel assembly is employed, in that the cooling which has flowed over the fuel assembly is monitored in downstream housing section 10. Any inleakage or outleakage in the coolant circuit is unacceptable, as fuel assembly monitoring would thereby be rendered unreliable.

The upper fuel subassembly section, approximately two and one-half inches in outside diameter and approximately thirty feet long, is inserted in a two and one-half inch diameter access port, which is formed in the topmost cover of the nuclear reactor. Throughout the assembly and coupling operation, support of the upper fuel housing section is possible only at the topmost portion thereof, thereby necessitating a remote coupling within the reactor interior. The sealing coupling of the present invention provides remote coupling that compensates for angular as well as off-set misalignment between fuel housing sections. Once coupled, sealing engagement between housing sections 10, 12 and coupling sleeve 16 is maintained despite lateral misaligning forces due to temperature variations and flow velocities.

When employed in the liquid sodium environment of the test reactor, the sealing coupling is preferably formed of Inconel 718 nickel alloy steel which provides resistance to self-welding, or diffusion welding in the high temperature oxygen-poor environment. The sodium flow within the housing sections has a temperature between 700° F. and 1250° F. while the sodium bath surrounding the pipe sections is maintained at temperatures between 700° and 900° F. Subsequent thermal warpage, or other misalignment, up to 0.437 inches, may be accommodated by the coupling arrangement of the present invention. A thermal liner 54 is incorporated in the sleeve coupling to moderate the transient effects of sodium temperature differential across the wall of sleeve 16. Pins 55 are employed to prevent an upward shift of liner 54 during remote coupling operations.

The embodiments of the invention in which an exclusive property or privilege is claimed are defined as follows:

1. A remotely operable releasable sealing coupling arrangement comprising:
   a first conduit having a concave conical sealing surface, an inwardly tapered end portion, and a retaining collar disposed therebetween, said retaining collar having a camming surface;
   a second conduit having a concave conical sealing surface; and
   a cylindrical sleeve having a first sleeve end which includes an inside wall surface for contacting said inwardly tapered portion of said first conduit end so as to limit the lateral deflection thereof when said inwardly tapered end portion of said first conduit is inserted in said first sleeve end, said first sleeve end further including a rounded outside corner forming a convex spherical surface for sealing engagement with said concave conical surface of said first conduit, and an inwardly projecting lip on said inside wall surface of said first sleeve end, said inwardly projecting lip having a camming surface for engagement with said retaining collar of said first conduit to hold said sleeve captive on said inwardly tapered end portion of said first conduit end with an interference fit, while permitting a swiveling of said sleeve thereabout, said cylindrical sleeve further having a second sleeve end which includes a rounded outside corner forming a convex spherical surface for sealing engagement with said concave conical sealing surface of said second conduit.

2. The arrangement of claim 1 wherein said retaining collar of said first conduit prevents axial movement of said lip of said cylindrical sleeve in a first direction, while permitting axial movement thereof in a second opposing direction so as to allow said first cylindrical sleeve end to contact said concave conical sealing surface of said first conduit.

3. The arrangement of claim 2 wherein said second conduit includes conical guide means and said second sleeve end includes radially inwardly directed vanes for camming against said conical guide means to provide concentric alignment of said first and said second conduits.

4. The arrangement of claim 3 wherein said second conduit further includes cylindrical guide means disposed adjacent said conical guide means, for camming against said vanes to provide concentric alignment between said sleeve and said second conduit end.

5. The arrangement of claim 4 wherein said first and said second conduits and said sleeve carry a flow of liquid metal.

6. The arrangement of claim 5 wherein said liquid metal comprises liquid sodium, and said first and said second conduits and said sleeve are comprised of Inconel 718.

7. The arrangement of claim 6 wherein said first and said second conduits comprise portions of a fuel assembly of a nuclear reactor.

* * * * *